US012106592B2

(12) United States Patent
Albines

(10) Patent No.: US 12,106,592 B2
(45) Date of Patent: Oct. 1, 2024

(54) INTERACTIVE KIOSK HAVING DOCUMENT READER

(71) Applicant: SITA INFORMATION NETWORKING COMPUTING CANADA, INC., Montreal (CA)

(72) Inventor: Daniel Albines, Montreal (CA)

(73) Assignee: SITA Information Networking Computing Canada, Inc. (CA)

( * ) Notice: Subject to any disclaimer, the term of this patent is extended or adjusted under 35 U.S.C. 154(b) by 520 days.

(21) Appl. No.: 17/415,417

(22) PCT Filed: Dec. 19, 2019

(86) PCT No.: PCT/CA2019/051862
§ 371 (c)(1),
(2) Date: Jun. 17, 2021

(87) PCT Pub. No.: WO2020/124244
PCT Pub. Date: Jun. 25, 2020

(65) Prior Publication Data
US 2022/0058384 A1 Feb. 24, 2022

(30) Foreign Application Priority Data
Dec. 21, 2018 (GB) .................................... 1821111

(51) Int. Cl.
*G06V 30/40* (2022.01)
*G06K 7/14* (2006.01)
*H04N 23/51* (2023.01)
(52) U.S. Cl.
CPC ........... *G06V 30/40* (2022.01); *G06K 7/1413* (2013.01); *H04N 23/51* (2023.01)

(58) Field of Classification Search
CPC .............................. G06V 30/40; H04N 23/51
See application file for complete search history.

(56) References Cited

U.S. PATENT DOCUMENTS

| 5,481,334 A | 1/1996 | Arimoto et al. |
| 5,623,581 A | 4/1997 | Attenberg |
| (Continued) | | |

FOREIGN PATENT DOCUMENTS

| CN | 203455848 U | 2/2014 |
| CN | 204066264 U | 12/2014 |
| (Continued) | | |

OTHER PUBLICATIONS

Combined Search and Examination Report issued in Great Britain Application No. GB1821111.0 dated Jun. 26, 2019; 9 pages.
(Continued)

*Primary Examiner* — Myron Wyche
(74) *Attorney, Agent, or Firm* — Morris, Manning & Martin, LLP; Daniel E. Sineway, Esq.; Adam J. Thompson, Esq.

(57) ABSTRACT

An interactive kiosk for reading a document, the kiosk comprising: a transparent platform for supporting a document; a first camera disposed below the transparent platform; a mirror assembly comprising at least one mirror disposed below the transparent platform, the mirror assembly being arranged to reflect light from the underside of the transparent platform to the lens of the first camera; and a control unit connected to the first camera, the control unit being configured to receive content from the first camera and extract data from a document disposed on the transparent platform.

15 Claims, 6 Drawing Sheets

(56) References Cited

U.S. PATENT DOCUMENTS

| | | | |
|---|---|---|---|
| 5,650,863 | A | 7/1997 | Utagawa et al. |
| 5,956,436 | A | 9/1999 | Chien |
| 6,069,681 | A | 5/2000 | Nakagawa et al. |
| 6,124,951 | A * | 9/2000 | Chiang ............ H04N 1/10 399/379 |
| 2006/0007822 | A1 | 1/2006 | Mashimo |
| 2006/0072822 | A1* | 4/2006 | Hatzav ............ G03B 15/00 382/181 |
| 2008/0296394 | A1 | 12/2008 | Melnik et al. |
| 2011/0297819 | A1 | 12/2011 | Mukawa et al. |
| 2013/0107056 | A1 | 5/2013 | Hatzav et al. |
| 2015/0036891 | A1 | 2/2015 | Takenouchi et al. |

FOREIGN PATENT DOCUMENTS

| | | |
|---|---|---|
| CN | 207052001 U | 2/2018 |
| DE | 202008015857 U1 | 3/2009 |
| JP | 2005157933 A | 6/2005 |
| JP | 2005167933 A | 6/2005 |
| JP | 2006173712 A | 6/2006 |
| KR | 20070050688 A | 5/2007 |
| KR | 20100008104 * | 8/2010 ............... G06K 9/20 |
| KR | 20100008104 U | 8/2010 |
| KR | 1020070050688 A | 8/2013 |
| WO | 2010098142 A1 | 9/2010 |
| WO | 2013042348 A1 | 3/2013 |
| WO | 2020124244 A1 | 6/2020 |

OTHER PUBLICATIONS

Combined Search and Examination Report issued in Great Britain Application No. GB1821111.0 dated Dec. 21, 2020; 6 pages.
Combined Search and Examination Report issued in Great Britain Application No. GB1821111.0 dated Dec. 6, 2021; 2 pages.
International Search Report and Written Opinion issued in International Application No. PCT/CA2019/051862 mailed Mar. 20, 2020; 10 pages.
Extended European Search Report for European Application No. 19899810.6, mailed Apr. 11, 2022, 8 Pages.
International Preliminary Report on Patentability for International Application No. PCT/CA2019/051862, mailed Jul. 1, 2021, 8 Pages.

* cited by examiner

INTERACTIVE KIOSK HAVING DOCUMENT READER

CROSS REFERENCE TO RELATED APPLICATIONS

This application is a national phase application of, and claims benefit of and priority to International Application No. PCT/CA2019/051862, filed Dec. 19, 2019, entitled "Interactive Kiosk Having Document Reader," which claims priority to Great Britain Application No. 1821111.0, filed Dec. 21, 2018, entitled "Interactive Kiosk Having Document Reader," the disclosures of which are incorporated herein by reference as if set forth herein in their entireties.

FIELD OF THE INVENTION

The present invention relates in general to an interactive kiosk for reading a document. More particularly, the present invention relates to such an interactive kiosk for use in large public or private spaces, such as airports, offices, shopping centres, event venues and rail or road stations. The present invention is particularly, but not exclusively concerned with such an interactive kiosk for use in an airport hub, rail or bus interchange, port or other travel interchange or termini.

BACKGROUND OF THE INVENTION

The volume of passengers travelling through airports or other travel termini has increased significantly in recent years. This places a greater burden on managing authorities, and transport providers, to more effectively manage their resources to accommodate the ever increasing needs and size of their passengers groups. For example, increased passenger volumes can often result in increased congestion at airports. This increased congestion also slows down the throughput of passengers from the airport entrance to the aircraft. This congestion and increasing queues at check-in counters may result in departure delays for airlines and may also impact the airport with additional costs and inefficiencies, as more staff are required to manage and coordinate passengers and their baggage. Furthermore, increased congestion can become particularly problematic in uncontrollable or unexpected circumstances. For example, in the event of unexpected bad weather, or unexpected maintenance in a portion of the airport.

In recent years, a number of automated facilities and processes have been introduced in such transport termini, for the purposes of improving efficiencies. One example of such a facility is an automated interactive kiosk, with which passengers can interactive in order to obtain the likes of a boarding pass and/or a bag tag. When interactive with such kiosks for such purpose, passengers are typically required to present the kiosk with an identity document, such as a passport, as part of an authentication process. In order to read such documents, the kiosks typically comprise a transparent platform on which the document can be placed, with a reading means disposed below the platform.

However, such reading means may not always reliably read the document placed on the platform. For example, some passengers may not know or not understand that they need to place the document with a readable portion of the document facing downwards on the platform. As another example, some reading means may fail to read the document, unless it is held perfectly still on the platform for a prolonged period of time. Alternatively or additionally, such reading means may require expensive or bulky equipment to be included within the kiosk, which has a consequence on the cost and/or size of the resultant kiosk.

Accordingly, it would be desirable to provide an interactive kiosk for document reading, which can overcome one or more of the above mentioned drawbacks with existing kiosks known in the art.

SUMMARY OF THE INVENTION

The invention is defined in the appended claims to which reference should now be made. Embodiments of the invention seek to address the above problems by providing an improved interactive kiosk for reading a document.

According to a first aspect of the present invention, there is provided an interactive kiosk for reading a document. The kiosk comprises: a transparent platform for supporting a document; a first camera disposed below the transparent platform; a mirror assembly comprising at least one mirror disposed below the transparent platform, the mirror assembly being arranged to reflect light from the underside of the transparent platform to the lens of the first camera; and a control unit connected to the first camera, the control unit being configured to receive content from the first camera. The control unit may be further configured to extract data from a document disposed on the transparent platform.

In contrast to interactive kiosks known in the art, the kiosk of the first aspect of the present invention comprises a mirror assembly comprising at least one mirror disposed below the transparent platform, the mirror assembly being arranged to reflect light from the underside of the transparent platform to the lens of the first camera. By providing such a mirror assembly the optical path length between the underside of the platform and the lens of the camera can be set at a desirable distance, without requiring the first camera to be disposed below the platform by said desirable distance. This may advantageously minimise the amount of space, and in particular the depth of space, required in the kiosk below the platform for the first camera. This may enable the kiosk to be made smaller and/or make more space available for other equipment within the kiosk. This may also advantageously mean that an expensive camera having a wide field of view does not need to be used below the platform in the kiosk.

According to a second aspect of the present invention, there is provided an interactive kiosk for reading a document, the kiosk comprising: a transparent platform for supporting a document; a first camera disposed below the transparent platform and having a lens configured to view the lower surface of the transparent platform; a second camera disposed above the transparent platform and having a lens configured to view the upper surface of the transparent platform; and a control unit connected to each of the first and second cameras, the control unit being configured to receive content from each of the first and second cameras. The control unit may be further configured to extract data from a document disposed on the transparent platform.

In contrast to interactive kiosks known in the art, the kiosk of the second aspect of the present invention further comprises a second camera disposed above the transparent platform, having a lens configured to view the upper surface of the transparent platform. Content from the second camera can be received by the control unit for data extraction. This can advantageously mean that the interactive kiosk of the second aspect of the present invention is capable of reading a document placed on the platform, when a readable side of the document is facing upwards. Accordingly, the kiosk of the second aspect of the invention may advantageously allow for information to be extracted from a document even when it has been placed incorrectly on the platform. Furthermore, the kiosk of the second aspect of the invention may advantageously allow for simultaneous reading of information from a dual sided document.

Furthermore, by having both the first and second cameras, the interactive kiosk is capable of reading a document placed on the platform, irrespective of which side of the document contains the readable content.

The kiosk of the first aspect of the present invention may additionally comprise any feature or features described in respect of the kiosk of the second aspect of the present invention, such as the second camera. The kiosk of the second aspect of the present invention may additionally comprise any feature or features described in respect of the kiosk of the first aspect of the invention, such as the mirror assembly. Preferred features of one or both of the first and second aspects of the invention are described below.

Ambient light may affect properties of the image or video captured by the first camera and/or the second camera. This may affect the speed at which data can be extracted from the document. This may result in inaccurate reading of data from the document, or prevent certain data from being extracted from the document. Accordingly, the present invention may be provided with a number of features, which can help to inhibit any adverse effects that the ambient light may on the content captured by the first and/or second cameras. Examples of such features are described in more detail below.

The transparent platform preferably comprises a reading area on which the document to be read should be placed. The platform preferably comprises one or more markings to indicate at least a portion of the boundary of the reading area. The one or more markings may be provided on the upper surface of the platform.

The platform may comprises a non-transparent coating which extends across the entirety of the platform except for the portion of the platform which defines the reading area. The non-transparent coating can help to reduce the amount of ambient light which can be received by the first camera when a document is placed on the reading area. The coating may be provided on one or both of the upper and lower surface of the transparent platform.

The platform may comprise any substrate formed of a material which is capable of transmitting light in the visible range (i.e. from about 390 nanometres to about 700 nanometres). Preferred materials include glass and transparent thermoplastics, such as polymethyl methacrylate.

The platform may be substantially horizontal. This may result in a simplified set-up for the first camera and/or the second camera.

It will be understood that the references to the orientation of the platform or any of the other components of the kiosk should apply when the kiosk is placed on a horizontal surface. Therefore, preferably the platform is disposed in the kiosk in an orientation, which results in the platform being substantially horizontal when the kiosk is disposed on a horizontal surface.

The platform is preferably substantially planar.

In some embodiments, the at least one mirror comprises a first mirror disposed below the platform, more preferably, disposed below the reading area of the platform. The first mirror is preferably disposed below the platform along a first line extending perpendicular to the plane of the platform. Thus, the first mirror is configured to receive light from the underside of the platform along a first portion of a first camera light path, wherein the first portion of the first camera light path extends substantially perpendicular to the plane of the platform. This means that when a document placed on the platform is viewed from the position of the first mirror, the width and length of the document as viewed at the first mirror is proportional to the actual width and length of the document. This can help to avoid a skew occurring in the image which reaches the first camera, and can therefore reduce the likelihood of an incorrect or failed reading occurring. The first mirror may be substantially planar. The first mirror may be inclined at an angle of between about 20 degrees and about 50 degrees relative to the plane of the platform, such as between about 25 degrees and about 40 degrees relative to the plane of the platform. In some preferred embodiments, the first mirror may be inclined at an angle of between about 30 degrees and about 35 degrees relative to the plane of the platform.

The first mirror is preferably arranged to reflect light from the underside of the platform along a second portion of the first camera light path such that said light reaches the first camera. The second portion of the first camera light path preferably extends substantially parallel to the plane of the platform. This can advantageously means that when the image of the document on the reader is reflected by the first mirror to the first camera, the width and length of the document as viewed at the first camera is proportional to the actual width and length of the document. This can advantageously reduce the likelihood of a false reading occurring, because of a distortion of or skew in the image received by the first camera. Furthermore, this may also mean that digital image correction is not needed, and thus reduces computational burden on the system and/or the complexity of the components used.

The first mirror may reflect light from the underside of the platform directly to the first camera. In such an embodiment, the first camera light path will consist solely of the first portion and the second portion. Alternatively, in some other embodiments, the mirror assembly may further comprise one or more additional mirrors for directing light from the first mirror to the first camera along one or more respective additional portions of the first camera light path. Said one or more additional mirrors may therefore be disposed along the first camera light path, between the first mirror and the first camera. Said one or more additional mirrors may be used to further increase the optical path length between the first camera and the transparent platform, in a manner which allows for a more efficient use of the space within the kiosk below the platform.

The one or more mirrors of the mirror assembly may be used to alter the properties of the image which is conveyed along the optical path to the first camera. For example, one or more mirrors of the mirror assembly may be used to magnify the image. Alternatively or additionally, the one or more mirrors of the mirror assembly may be used to adjust properties of the image, such as to compensate for any skew which may be imposed on the image by virtue of the positioning of the mirror assembly and the first camera. Compensation for such skew may be particular important when seeking to accurately read a document placed on the platform, since image analysis may be reliant on specific width to breadth proportions of the image.

In some preferred embodiments, the one or more mirrors comprise a second mirror, the second mirror being between the first mirror and the first camera along the first camera light path. The second mirror may face substantially downwards in the kiosk. The second mirror may be substantially planar. The second mirror may be positioned above the first camera. Where the second mirror is present, the first mirror is preferably arranged to reflect light from the underside of the platform to the second mirror.

The second mirror is preferably arranged to reflect light received from the first mirror to the first camera. The second mirror may be inclined at an angle of between about 20 degrees and about 50 degrees relative to the plane of the platform, such as between about 20 degrees and about 45 degrees relative to the plane of the platform. In some preferred embodiments, the second mirror may be inclined at an angle of between about 30 degrees and about 35 degrees relative to the plane of the platform.

The kiosk may further comprises one or more light screens positioned between the first mirror and the first camera along the first camera light path. Where a second mirror is present in the kiosk, the one or more light screens may be positioned between the first mirror and the second mirror along the first camera light path. The one or more light screens may be used to reduce glare from the first light sources reaching the first camera. The one or more light screens may be used to reduce ambient light from reaching the first camera. This may help to increase the likelihood of the first camera correctly reading a document placed on the transparent platform of the kiosk.

Each light screen may have a first portion which is non-transparent, and a transparent portion at least partially delimited by the first portion. The transparent portion may be completely delimited by the first portion. The first portion may be a substantially planar object. The transparent portion may be formed as an opening or window provided in the first portion. The window may be an empty space. Alternatively the window may be formed by a transparent material, such as glass or a transparent thermoplastic, such as polymethyl methacrylate. The first portion may be a main portion of the light screen.

The one or more light screens may include a first light screen positioned between the first mirror and the first camera along the first camera light path. The first light screen may be disposed in an inclined position within the kiosk. The first light screen may incline towards the first mirror. The lower edge of the first light screen may be shaped to define a recess for permitting one or more cables to pass underneath the first light screen.

The one or more light screens may also include a second light screen positioned between the first light screen and the first camera along the first camera light path. The second light screen may be disposed between the first light screen and the second mirror along the first camera light path. The second light screen may have a substantially vertical orientation. The lower edge of the first light screen may be shaped to define a recess for permitting one or more cables to pass underneath the first light screen.

The kiosk may comprise a housing. The platform may be disposed in a recess in the housing. By providing the platform in a recess of the housing the amount of ambient light which can reach the platform may be reduced.

The recess may be formed in a wall of the housing, with the platform being accessible through an opening in the wall of the housing. The wall may be the front wall of the housing. The wall of the housing may comprise a lower portion disposed below the recess and an upper portion disposed above the recess. The wall of the housing may extend in a direction from the base of the kiosk to the top of the kiosk.

The recess may have a base which extends from the wall of the housing into the kiosk. The base of the recess may comprise the transparent platform. Preferably, the transparent platform slopes away from the opening in the wall of the housing. That is preferably the platform is inclined so that the back portion of the platform (which is disposed towards the back of the recess) is positioned lower than the front portion of the platform (which is disposed towards the front of the recess). This may be particularly beneficial when seeking to reduce the amount of ambient light which is received by the first camera disposed below the platform. This is because the viewing angle of the first camera below the platform can be oriented away from the opening of the recess, meaning that less ambient light can be seen by the first camera. In such embodiments, the first camera is preferably disposed below the platform, within the kiosk, and proximate to the front wall of the kiosk. Alternatively or additionally, where a mirror assembly is provided below the platform, and the mirror assembly comprises the first mirror, said first mirror is preferably disposed below the platform, within the kiosk, and proximate to the front wall of the kiosk. In such a position, the first camera or first mirror may be subjected to a reduced amount of ambient light.

The recess of the kiosk may have one or more side walls extending upwards from the base of the recess. In particular, the recess may have first and second side walls each extending upwards from a side edge of the base of the recess, and a rear wall extending upwards from a rear edge of the base of the recess. The recess may also have a top wall extending across the top of the recess, from each of the top edges of the rear wall and first and second side walls. Where a second camera is provided in the kiosk, the second camera may be mounted in or on the top wall of the kiosk. This can allow the second camera to look directly down on the reading area of the transparent platform. Such an arrangement can also help to prevent the second camera from receiving too much ambient light, and thereby help to ensure that the second camera can still view a document placed on the reading area of the transparent platform.

Where the platform comprises a reading area, preferably the reading area is spaced away from the front wall of the housing. By providing the reading area in a location which is spaced away from the front wall of the housing, the document will be positioned further into the recess when it is being read. In such a position, less ambient light will be able to reach the document. This can improve one or both of the accuracy and speed for reading information from the document.

Preferably the recess comprises a back wall extending upwards from the back edge of the recess base. Preferably, the recess comprises a top wall extending from the top edge of the back wall to the opening of the recess. The front edge of the recess top wall may be disposed adjacent to the lower edge of upper portion of the kiosk wall which defines the recess. This may define the upper edge of the opening in the kiosk.

The kiosk may further comprise one or more light sources for illuminating the platform. Preferably, the kiosk comprises one or more first light sources disposed below the platform and configured to illuminate the lower surface of the platform. At least one of the one or more first light sources is preferably positioned below the platform and adjacent to the first mirror. Where a first light screen is provided in the kiosk, the one or more first light sources may be positioned between the first light screen and the first mirror.

The kiosk may further comprise a light diffuser disposed adjacent to the one or more first light sources. The diffuser may be positioned above the one or more first light sources. The diffuser may help to spread out light emitted from the one or more first light sources. This may help to prevent the first camera receiving glare from the one or more first light sources. This may help to prevent shadows from forming within the kiosk, which could adversely affect the performance of the first camera in reading a document placed on the transparent platform.

As an alternative to or in addition to using a light diffuser, the one or more first light sources may be positioned underneath the first mirror and arranged to illuminate the underside of the first mirror. This may in effect help to diffuse the light produced by the one or more light sources and hence achieve one or more of the advantages noted above.

Preferably, the kiosk comprises one or more second light sources disposed above the platform and configured to illuminate the upper surface of the platform. At least one of the one or more second light sources is preferably positioned towards the back of the recess.

The one or more light sources of the kiosk preferably comprise one or more light emitting diodes (LEDs), more preferably an array of light emitting diodes. Preferably, each light source has a power consumption of less than 5 W.

The kiosk may further comprise a light chamber disposed below the platform. The light chamber may contain the first camera. The light chamber may contain the mirror assembly. The light chamber may contain the one or more first light sources for illuminating the lower surface of the platform. The light chamber may be an enclosed space having non-transparent walls. The upper periphery of the light chamber may be defined by the platform. For example, the light chamber may be defined by a plurality of adjoined enclosing walls, in which the only transparent portion of the walls is the reading area of the platform. In this way, the only way that ambient light can enter the light chamber is via the transparent reading area of the platform.

The light chamber may be box-shaped having a base, with four upstanding side walls, and a top cover comprising the platform. The top cover may comprise a frame and the transparent platform held by the frame. The side walls may connect to one or both of the base and the frame of the top cover by way of engagement between screws and corresponding threaded blocks. The threaded blocks may be provided on the inner surface of the side walls. The threaded blocks are provided for receiving the screws.

The platform may be substantially planar and have an upper surface facing away from the light chamber and a lower surface facing into the light chamber. The platform may have a thickness measured between the upper and lower surfaces. The platform may have four edges extending around the periphery of the platform. The edge may be angled such that the lower surface of the platform has a greater surface area than the upper surface of the platform. The frame may have four angled inner surfaces, each corresponding to one of the angled edges of the platform. The angled inner surfaces of the frame and the angled edges of the platform may abut one another when the platform is held within the frame. This may help to prevent any ambient light from entering the light chamber.

Each side wall of the light chamber may have a reduced thickness in its upper and/or lower portions. These portions of reduced thickness may be configured so that the side walls can connect to one or both of the base and the frame of the top cover, through an overlapping arrangement. Consequently, the base may comprises four upstanding side portions. These side portions of the base may each overlap with a corresponding lower portion of reduced thickness of one of the side walls, when the base is connected to the side walls. Similarly, the frame may have four downwardly extending side portions. These side portions of the frame may each overlap with a corresponding upper portion of reduced thickness of one of the side walls, when the frame is connected to the side walls. This overlapping arrangement may advantageously mean that light cannot easily escape from the light chamber and/or easily enter the light chamber, via any gaps between the side walls and the base and frame of the top cover.

Components of the light chamber may be mounted to one or more of the side walls, base and top cover of the platform. This can help to keep the components securely in place. This may help to ensure that the first light path is not altered by movement of the kiosk, for example during transport of the kiosk. This can be particularly important when the first light path has been carefully calibrated during manufacture of the kiosk.

Where the following preferred features are present in the kiosk, they may be mounted in the following ways. The first mirror may be mounted between two opposed side walls of the light chamber. A bottom edge of the first mirror may rest on the base of the light chamber. The second mirror may be mounted between two opposed side walls of the light chamber. These may be the same side walls as those to which the first mirror is mounted.

The first light screen may be mounted between two opposed side walls of the light chamber. A bottom edge of the first light screen may rest on the base of the light chamber.

The second light screen may be mounted between two opposed side walls of the light chamber. A bottom edge of the second light screen may rest on the base of the light chamber.

The first light source may be mounted to the base of the light chamber. The first camera may be mounted to one or both of the base of the light chamber and a side wall of the light chamber.

Where the light chamber contains one or more light screens, the light screens may divide the light chamber into two or more zones. For example, the light chamber may comprise a first zone containing the portion of the first camera light path which extends from the transparent platform to the one or more light screens, said zone including the first mirror. The light chamber may further comprise a second zone containing the portion of the first camera light path which extends from the one or more light screens to the first camera, said zone including the second mirror. The one or more light screens therefore divide the portion of the light chamber containing the part of the transparent platform on which a document is to be placed (i.e. the first zone) from the portion of the light chamber containing the first camera (i.e. the second zone). This arrangement can help to ensure that, to the extent possible, the first camera is only able to receive incoming light which has been reflected from the underside of the transparent part of the transparent platform on which a document is to be placed.

The base of the light chamber may include an opening for cabling. The opening may be a grommet opening. The opening may arranged to reduce the likelihood of the opening interfering with light conditions in the light chamber. For example, the opening may be arranged so that ambient light is not able to enter the light chamber through the opening. As another example, the opening may be arranged so that little or no light from the one or more light sources in the light chamber can exit the light chamber through the opening. The opening may be located on the base of the second zone of the light chamber.

The term "upper surface" is used throughout the specification to refer to the surface of the platform which faces towards the second camera. On the other hand, the term "lower surface" is used throughout the specification to refer to the surface of the platform which faces towards the first camera.

The present invention relates to an interactive kiosk for reading a document. The interactive kiosk is preferably configured to provide one or more of the following services or functions: check-in, flight booking, flight re-booking, ticket changing, airport information, flight status checking, document verification, passenger verification, boarding pass printing, bag tag printing and the like. The kiosk may therefore comprise one or more of the following: a display screen, preferably a touch-screen display; a reader, such as barcode scanner; a printer, such as a boarding pass or bag tag printer; a microphone; a camera facing away from the kiosk, preferably associated with facial recognition software; and one or more audio speakers. The kiosk may be referred to as a check-in kiosk. The kiosk may be configured for use in a transport hub, such an airport.

The preferred features described above in respect of the transparent platform, first camera, second camera, control unit, and/or mirror assembly may advantageously serve to provide the kiosk with document reading functionality, and in particular, with functionality for reading and optionally verifying an identity document, such as a passport.

Where the kiosk comprises a recess formed in the wall of the housing, with the platform being accessible through an opening in the wall of the housing, the kiosk preferably includes a display screen disposed above the recess, and/or a printer disposed above or below the recess.

The kiosk may comprise one or more internal batteries for powering one or more of the components of the kiosk, such as one or more of the first camera, the second camera, the one or more light sources, and the control unit. A charging port may be provided on the kiosk for charging the one or more batteries. Alternatively or additionally, the kiosk may comprise a power cable for connecting the kiosk to a mains power supply, for powering one or more of the components of the kiosk.

The kiosk may comprise a wireless communication module. This may enables the kiosk to form a wireless communication link with one or more remote servers such as a departure control system, and/or a resource management system. The kiosk may connect to such servers via one or more wireless beacons distributed within a transport hub environment.

It will be appreciated that preferred features described above in relation to one aspect of the invention may also be applicable to other aspects of the invention.

BRIEF DESCRIPTION OF THE DRAWINGS

Embodiments of the invention will now be described, by way of example only, with reference to the accompanying drawings, in which:

Referring now to FIGS. 1a and 1b of the drawings, in an embodiment of the present invention, there is provided is an interactive kiosk 1. The kiosk 1 has a housing with a front wall 101 a first side wall 102, a second side wall 103 and a rear wall 104. The front wall of the kiosk is provided with a recess 105, which provides access to a transparent platform 10 for supporting a document. The transparent platform is provided as part of a base 106 of the recess 105. Although not visible in FIGS. 1a and 1b, a first camera is provided in the kiosk 1 below the platform 10, and is configured to view the underside of the platform 10.

Figure 1A:
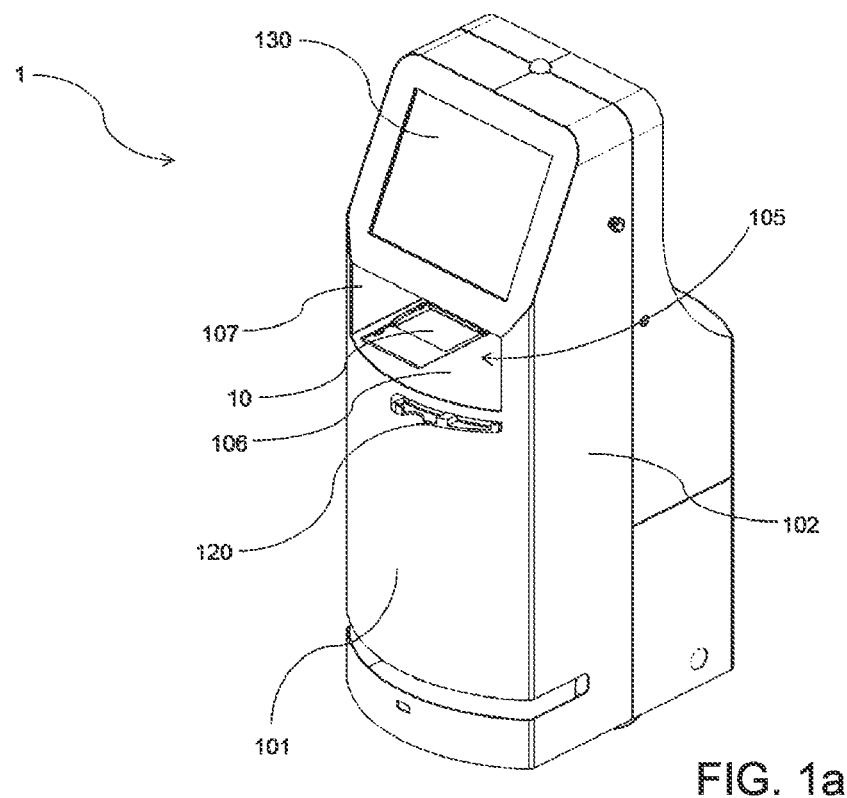
FIGS. 1a and 1b are perspective views of an interactive kiosk according to an embodiment of the invention.
Figure 1B:
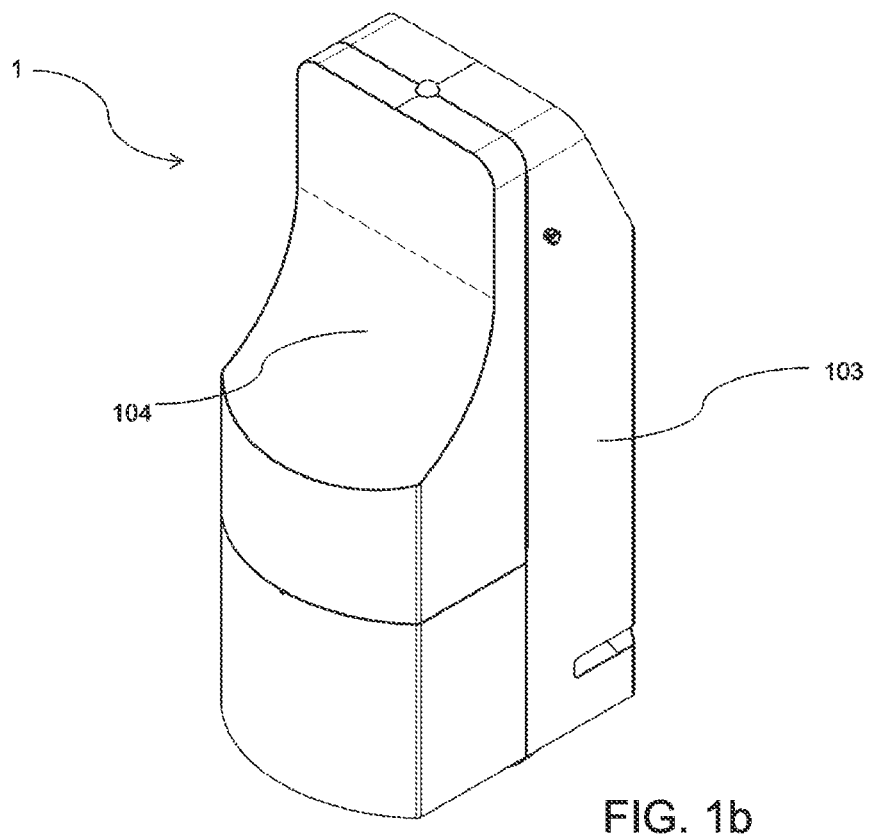

The recess has a first side wall 107, a second side wall, and a rear wall, each extending upwards from the base of the recess 105. Only the first side wall 107 is visible in FIG. 1a. The recess 105 also has a top wall extending across the top of the recess, from each of the top edges of the rear wall and first and second side walls. Although not visible from FIG. 1a or FIG. 1b, a second camera is mounted in or on the top wall of recess 105 of the kiosk 1. Said camera looks directly down on the transparent platform 10. The first and second cameras will be described in more detail below with reference to FIGS. 2 to 6.

The front wall 101 of the kiosk is also provided with a print-out tray 120 onto which the kiosk can print a boarding pass and/or bag tag. The print-out tray 120 is disposed below the recess 105.

The front wall 101 of the kiosk is also provided with an interactive touch screen 130 that an airline passenger can interact with in order for the kiosk 1 to perform one or more functions, such as check-in, flight booking, flight re-booking, ticket changing, airport information, flight status checking, document verification, passenger verification, boarding pass printing, bag tag printing and the like. The interactive touch screen 130 is disposed above the recess 105.

Figure 2:
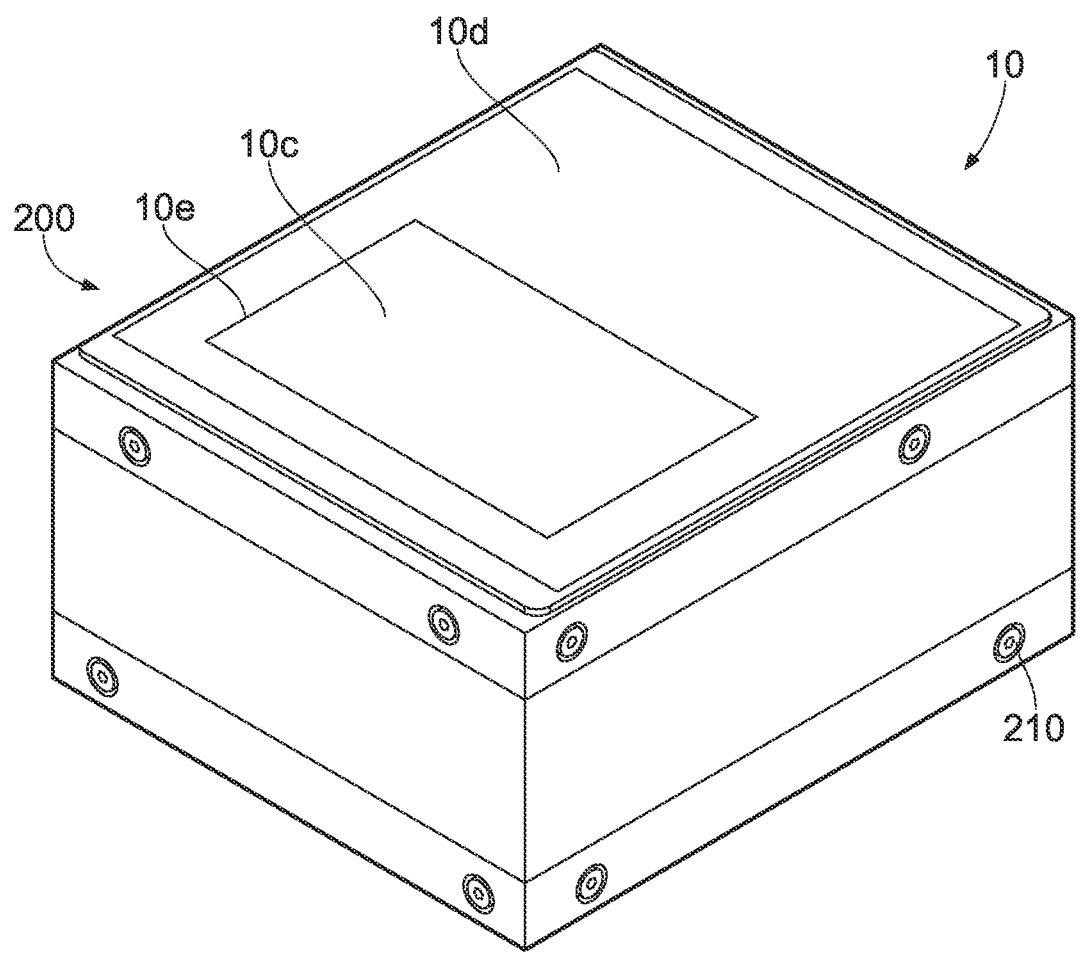
FIG. 2 shows a perspective view of a light chamber for an interactive kiosk according to an embodiment of the invention.
Figure 3:
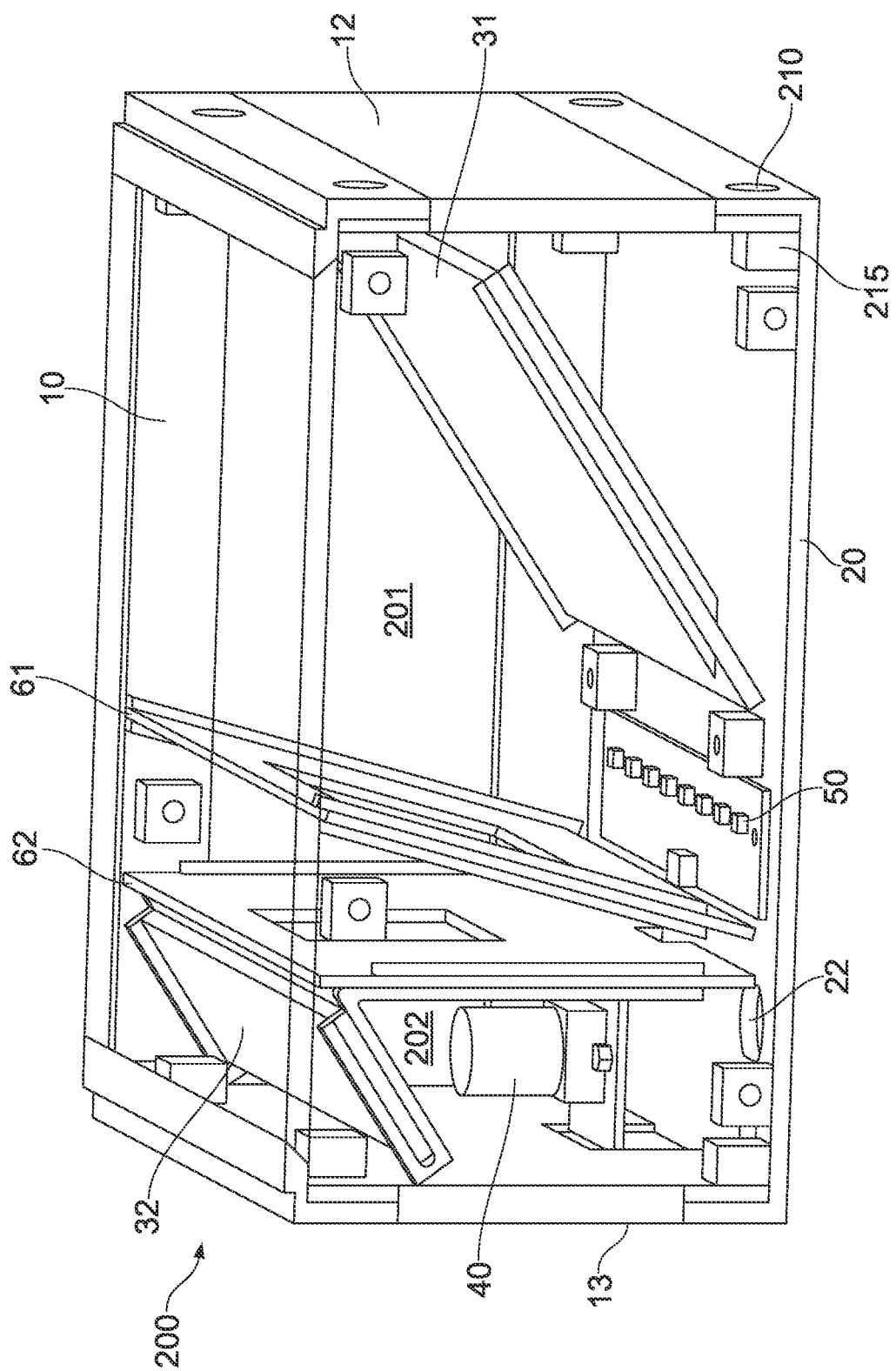
FIG. 3 shows a partially transparent perspective view of the light chamber of FIG. 2.
Figure 4:
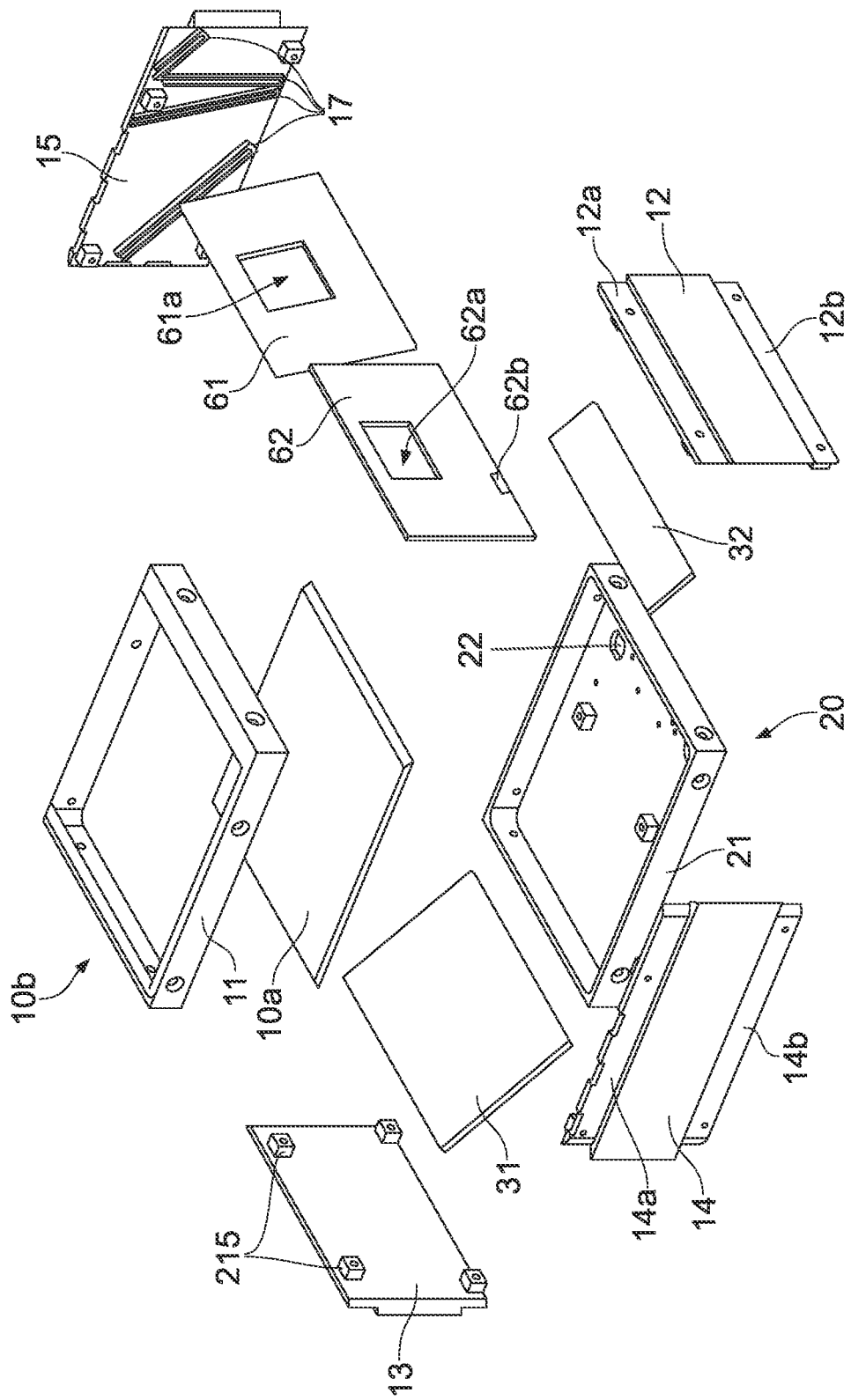
FIG. 4 shows an exploded view of at least some of the components of the light chamber of FIGS. 2 and 3.
Figure 5:
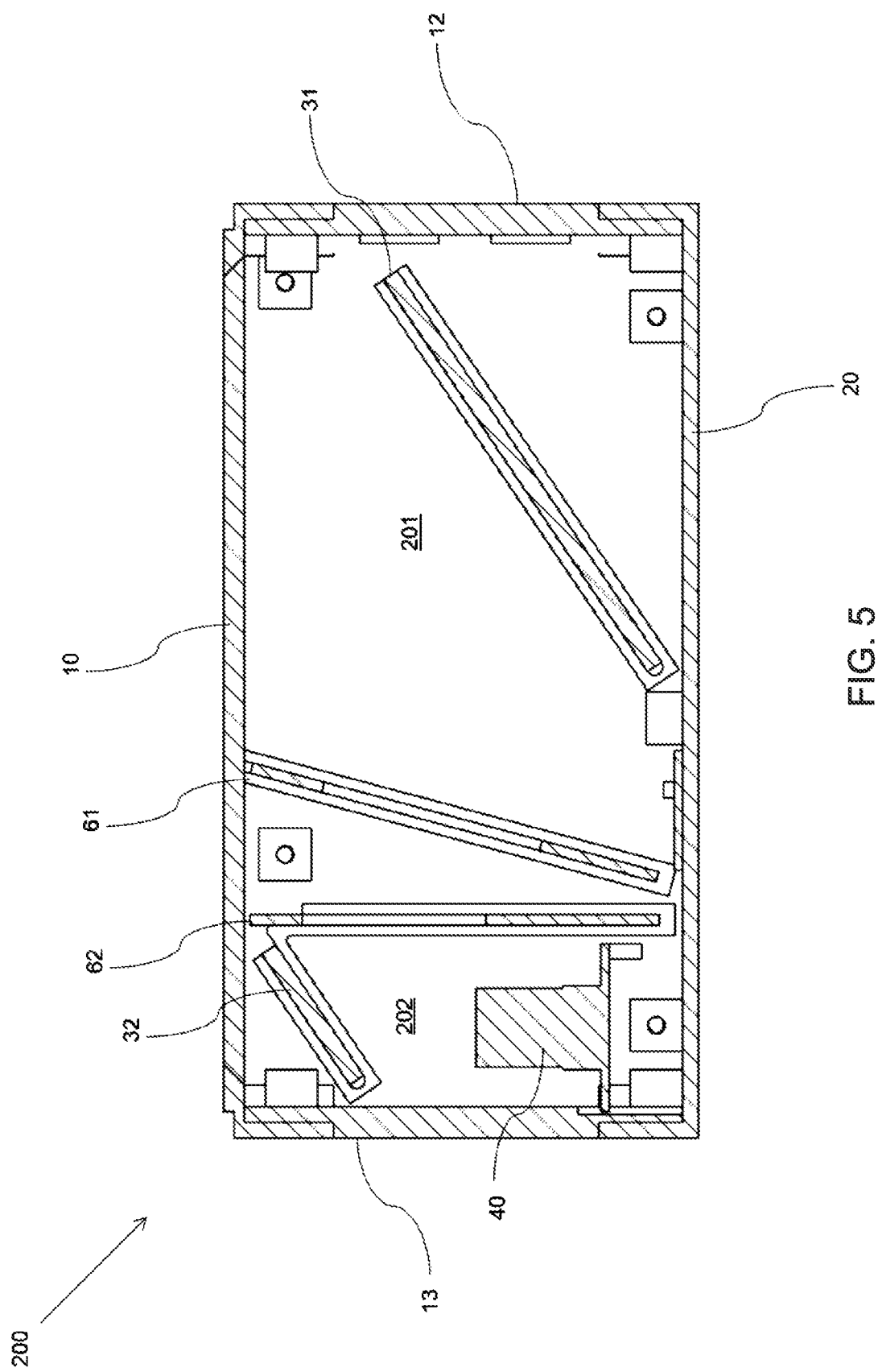
FIG. 5 shows a cross sectional view of the light chamber of FIGS. 2 and 3.

FIG. 2 shows a perspective view of a light chamber 200 for an interactive kiosk according to an embodiment of the invention. FIG. 3 shows a partially transparent perspective view of the light chamber 200 of FIG. 2. The light chamber 200 may be provided as a part of the kiosk 1 of FIGS. 1a and 1b. FIG. 4 shows an exploded view of at least some of components of the light chamber 200 of FIGS. 2 and 3.

With reference to FIGS. 2 to 4, the light chamber 200 is in the form of a box having non-transparent walls defining an enclosed space. The upper periphery of the light chamber box 200 is defined by a top cover, which comprises the platform 10 and a frame 10b. The platform 10 comprises a glass substrate 10a, which is held within the frame 10b. The frame 10b connects to four side walls 12, 13, 14, and 15; namely a first light chamber side wall 12, a second light chamber side wall 13, a third light chamber side wall 14 and a fourth light chamber side wall 15. The four side walls 12, 13, 14, and 15 connect to a base 20 of the light chamber 1. The side walls connect to the base 20 and the frame 10b of the top cover by way of engagement between screws 210 and corresponding threaded blocks 215.

The platform, and in particular the glass substrate 10a is substantially planar and has an upper surface facing away from the light chamber 200 and a lower surface facing into the light chamber 200. The substrate 10a also has a thickness measured between the upper and lower surfaces. The glass substrate 10a also has four edges extending around the periphery of the substrate 10a. As best seen from FIG. 3 and FIG. 4, the edges are angled such that the lower surface of the substrate 10a has a greater surface area than the upper surface of the substrate 10a. The frame 10b also has four angled inner surfaces, each corresponding to one of the angled edges of the glass substrate 10a. These angled inner surfaces of the frame 10b and the angled edges of the substrate 10a abut one another when the substrate 10a is held within the frame 10b, and help to prevent any ambient light from entering the light chamber 200.

As best seen from FIG. 3 and FIG. 4, each side wall 12, 13, 14, 15 has a reduced thickness in its upper and lower portions. For simplicity, this has only been illustrated by way of reference numerals for side walls 12 and 14 in FIG. 4, where the upper portions of reduced thickness are indicated by 12a and 14a, and the lower portions of reduced thickness are indicated by 12b and 14b.

The side walls contain these reduced thickness portions so that they can connect to the base 20 and the frame 10b of the platform 10, through an overlapping arrangement. This overlapping arrangement can be best seen from FIGS. 3 to 5. In particular, as identified in FIG. 4, the base 20 comprises four upstanding side portions 21. These portions 21 each overlap with a corresponding lower portion of reduced thickness of one of the side walls 12, 13, 14, 15, when the base 20 is connected to the side walls 12, 13, 14, 15. Similarly, as identified in FIG. 4, the frame 10b has four downwardly extending side portions 11. These portions 11 each overlap with a corresponding upper portion of reduced thickness of one of the side walls 12, 13, 14, 15, when the frame 10b is connected to the side walls 12, 13, 14, 15. This overlapping arrangement advantageously means that light cannot easily escape from the light chamber 200, or easily enter the light chamber 200, via any gaps between the side walls and the base 20 and frame 10b of the platform 10.

As shown in FIG. 2, the platform 10 comprises a reading area 10c on which the document to be read should be placed. The platform 10 comprises a non-transparent coating 10d which extends across the entirety of the platform 10 except for the portion of the platform which defines the reading area 10c. The coating 10d may be provided on one or both of the upper and lower surface of the glass substrate 10a of the transparent platform 10. A sticker may alternatively be used instead of a coating to define the non-transparent portion of the platform 10. The platform 10 also comprises one or more markings 10e to indicate at least a portion of the boundary of the reading area 10c.

Within the light chamber 200 is a first mirror 31, which is substantially planar and disposed below the reading area 10c of the platform 10. The first mirror 31 is inclined relative to the plane of the platform 10 and configured to reflect light received from the underside of the platform 10 towards a second mirror 32. The second mirror 32 is disposed in an opposing corner portion of the light chamber 200 to the first mirror 31. The second mirror 32 is also inclined relative to the plane of the platform 10 and configured to reflect light received from the first mirror 31 towards a first camera 40 disposed in the light chamber 200. The first camera 40 is disposed below the second mirror 32 and also disposed in an opposed corner of the light chamber 200 compared to the location of the reading area 10c. Within the chamber there therefore exists a first camera light path (not shown) which extends from the lower surface of the reading area 10c to the first camera 40 via the first mirror 31 and the second mirror 32. Between the first mirror 31 and second mirror 32 is a first light screen 61 and a second light screen 62. The light screens 61 and 62 are substantially planar articles which extend across the entire cross section of the light chamber so as to divide the light chamber into two zones. The light screens may therefore help to control the amount of light which reaches the first camera 40. The light screens may also ensure that only light originating from a certain location is able to reach the first camera 40.

The light screens 61, 62 divide the light chamber into a first zone 201 and a second zone 202. The first zone 201 contains the portion of the first camera light path which extends from the transparent platform 10 to the first light screen 61, said zone includes the first mirror 31. The second zone 202 contains the portion of the first camera light path which extends from the second light screen 62 to the first camera 40, said zone includes the second mirror 32. The first light screen 61 contains a hollow central portion, which defines a window 61a for light to pass through. The second light screen 62 also contains a hollow central portion, which defines a window 62a for light to pass through. The lower edge of the second light screen 62 is shaped to define a recess 62b for permitting one or more cables to pass underneath the second light screen 62. The arrangement of the first and second light screens 61, 62 can help to ensure that, to the extent possible, the first camera 40 is only able to receive incoming light which has been reflected from the underside of the transparent part of the transparent platform 10 on which a document is to be placed.

As best illustrated by FIG. 4, the inner surface of the second and third light chamber side walls 14, 15 are provided with mounts 17 for supporting a respective edge of one of the first mirror 31, the second mirror 32, the first light screen 61, and the second light screen 62.

Figure 6:
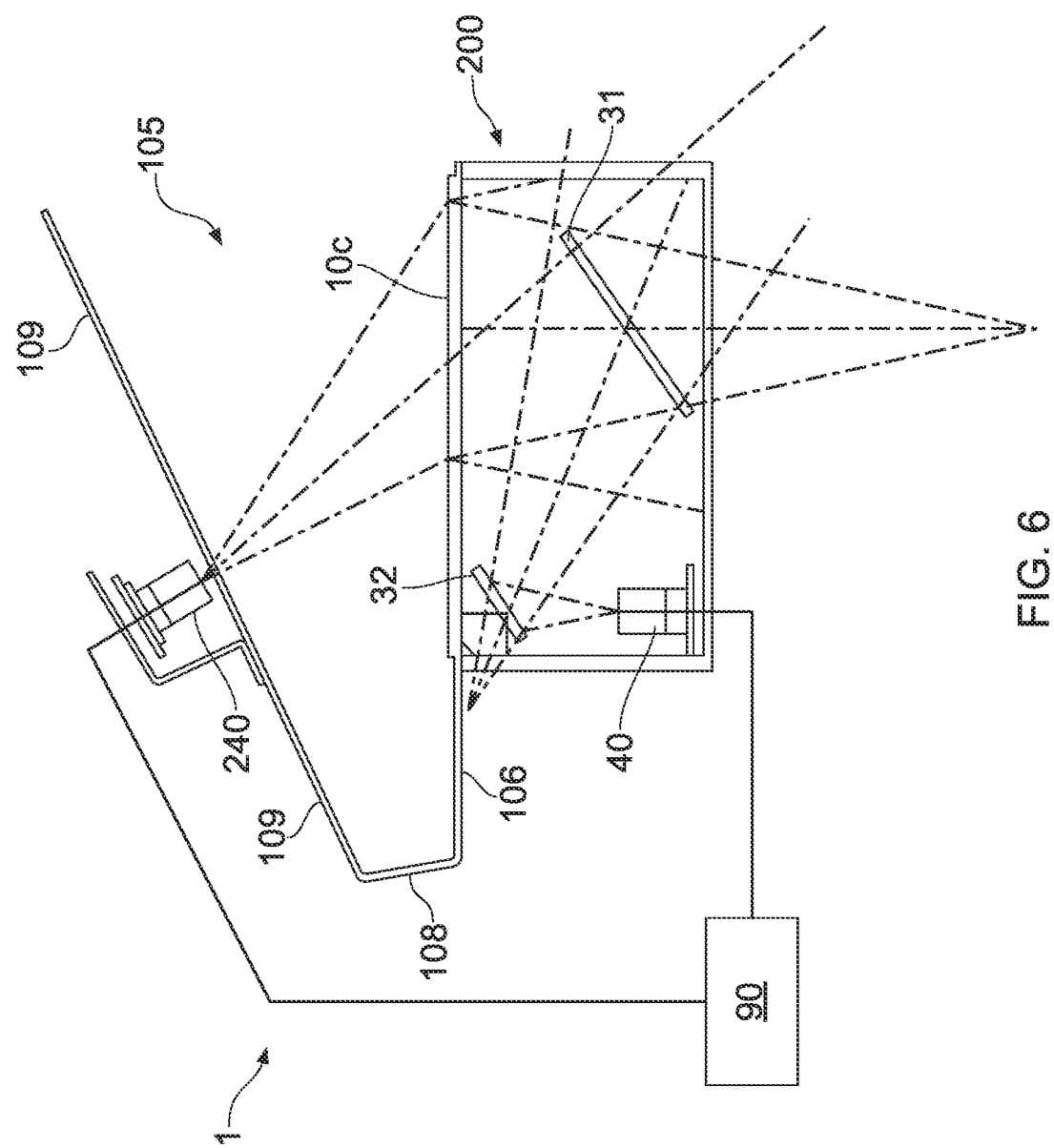
FIG. 6 shows a cross sectional view of a portion of an interactive kiosk according to an embodiment of the invention.

FIG. 6 shows a cross sectional view of a portion of an interactive kiosk according to an embodiment of the invention. For simplicity not all components of the kiosk 1 are depicted in FIG. 6. In the embodiment of FIG. 6, the kiosk comprises the first camera 40 and a light chamber 200 as described generally above in relation to FIGS. 1 to 5. However, for simplicity not all of the components of the light chamber 200 are shown in FIG. 6.

In FIG. 6, the kiosk 1 also has a recess 105 with a base 106 extending from the opening of the recess 105 into the kiosk 1. The recess has a rear wall 108, which extends upwards from the rear edge of the base 106. The recess also has a top wall 109, which extends from the top edge of the rear wall 108 to the opening of the recess 105.

A second camera 240 is mounted to the top wall 109 of the recess. The second camera 204 faces downwards towards the reading area 10c of the platform. The second camera 240 is therefore configured to view the top side of the reading area 10c and capture an image of a document placed on the top side of the reading area 10c.

Ray traces indicating the field of views of the first and second cameras 40, 240 and the optical characteristics of the assembly of FIG. 6 are depicted in FIG. 6 by partially dashed lines. In particular, as illustrated by FIG. 6, the first mirror 31 and the second mirror 32 are each inclined at an angle of about 34 degrees relative to the plane of the platform 10. Furthermore, the second camera 240 is orientated so that it is at an angle of about 30 degrees relative to the plane of the platform 10.

The kiosk of FIG. 6 also comprises a control unit 90 connected to each of the first and second cameras 40, 240. The control unit 90 is configured to receive content from each of the first and second cameras 40, 240 and extract data from a document disposed on the transparent platform 10. The control unit 90 may comprise a combination of hardware and software.

The control unit 90 may be configured to receive content from the first and second cameras 40, 240 and determine which side of a document placed on the platform is the readable side. In particular, the control unit 90 may be configured to analyse video and/or image content received from each of the first and second cameras 40, 240 and extract data from said content. The control unit 90 may be coupled to other computing components of the kiosk 1, and/or coupled to one or more external servers.

For example, the control unit 90 may be coupled to a departure control system (DCS). The DCS may optionally comprise a local or remotely stored database. Usually, the departure control system resides on a computer or server which is communicatively coupled, via wired or wireless communication means, such as a transmitter or receiver, to the interactive kiosk 1, and in particular, to the control unit 90 of the interactive kiosk 1. Alternatively, or in addition, the departure control system may be communicatively coupled to a central server or computer which may be communicatively coupled to the interactive kiosk 1. The database may be stored on a writeable or rewriteable storage medium such as hard disk or solid state storage means such as flash drive, ROM, RAM, or other storage means which will be known to the skilled person, such as cloud storage. The database usually comprises passenger data associated with a passenger who has previously booked or made a reservation for a ticket for travel on a particular scheduled flight operated by an airline. Such departure control systems and ticketing/sales control systems are well known to the skilled person, and therefore will not be described in further detail. The DCS may comprise a server or computer hardware coupled to the storage medium.

Upon presentation of an identity document, such as a passport, on the reading area 10c of the platform 10, the first and second cameras 40, 240 may be activated to capture video and/or image content. The captured content may then be sent to the control unit 90 for processing. The control unit may be configured to determine whether the first camera 40 or the second camera 240 is the one providing content which contains extractable data. The control unit can extract data from the received video and/or image content, such as data provided on the identity document. This data may include one or more of a passenger name, date of birth and identification number. The control unit 90 may be configured to inactivate the camera, which it has determined to not be providing content with extractable data. This may help to reduce power consumption and/or computational resources.

The control unit may be configured to compare extracted data with data stored in a database, to verify the authenticity of the identification document. The database may be stored locally on the kiosk 1 and/or may be stored on a remote server, such as a departure control system.

The server or servers described herein may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C #, C++, Java, scripting languages, assembly languages, machine code instructions, instruction-set-architecture (ISA) instructions, and state-setting data.

The computer readable program instructions described herein may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

The wired or wireless communication networks described herein may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers. The user interface described above may comprise a Graphical User Interface.

The invention claimed is:

1. An interactive kiosk for reading a document, the kiosk comprising:
   a transparent platform for supporting a document;
   a first camera disposed below the transparent platform and having a lens configured to view an underside of the transparent platform;
   a second camera disposed above the transparent platform and having a lens configured to view a topside of the transparent platform;
   a control unit connected to each of the first and second cameras, the control unit being configured to receive content from each of the first and second cameras; and
   one or more light screens positioned between the transparent platform and the first camera.

2. The interactive kiosk according to claim 1, wherein the control unit is further configured to process the image content captured by the first and second cameras and determine whether the first camera or the second camera is providing extractable content to extract data from a document disposed on the transparent platform.

3. The interactive kiosk according to claim 2, wherein the control unit is configured to inactivate the camera, which it has determined to not be providing content with extractable data.

4. The interactive kiosk according to claim 1, wherein the kiosk comprises a housing having a wall and the transparent platform is disposed in a recess formed in the wall of the housing, the platform being accessible through an opening in the wall of the housing.

5. The interactive kiosk according to claim 1, wherein the transparent platform is inclined so that a back portion of the platform is positioned lower than a front portion of the platform.

6. The interactive kiosk according to claim 1, wherein at least one of the one or more light screens comprises a first portion which is non-transparent and a transparent portion at least partially delimited by the first portion.

7. The interactive kiosk according to claim 6, wherein the first portion is a substantially planar object and wherein the transparent portion is formed as an opening or window provided in the first portion.

8. The interactive kiosk according to claim 1, wherein the transparent platform comprises a reading area.

9. The interactive kiosk according to claim 8, wherein the transparent platform comprises a non-transparent coating which extends across an entirety of the platform except for a portion of the platform which defines the reading area.

10. The interactive kiosk according to claim 8, wherein the transparent platform comprises one or more markings to indicate at least a portion of a boundary of the reading area.

11. The interactive kiosk according to claim 1, wherein the transparent platform is substantially horizontal.

12. The interactive kiosk according to claim 1, wherein the kiosk further comprises one or more light sources for illuminating the platform.

13. The interactive kiosk according to claim 12, wherein the one or more light sources comprise one or more first light sources disposed below the platform and configured to illuminate a lower surface of the platform.

14. The interactive kiosk according to claim 13, wherein at least one of the one or more first light sources is positioned proximate to a wall of the kiosk having an opening.

15. The interactive kiosk according to claim 12, wherein the one or more light sources comprise one or more second light sources disposed above the platform and configured to illuminate an upper surface of the platform.

\* \* \* \* \*